(No Model.)
A. E. McCLENDON.
HARROW AND CULTIVATOR.
No. 465,193. Patented Dec. 15, 1891.
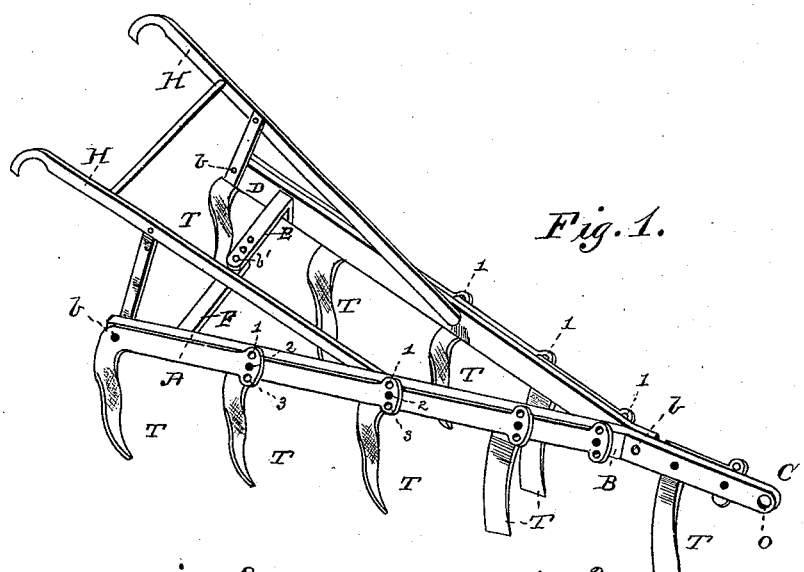
Fig. 1.
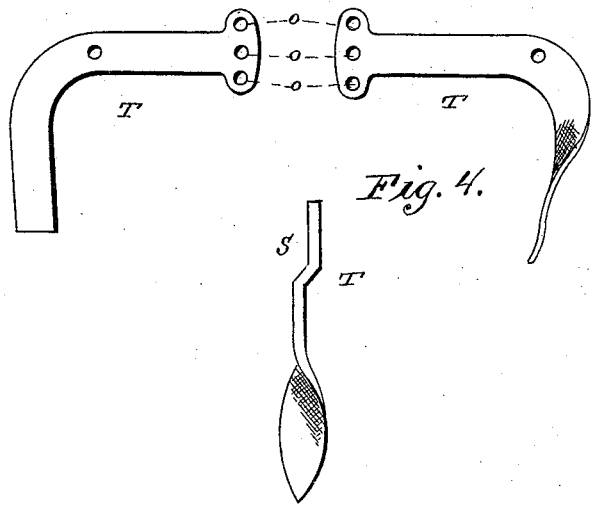
Fig. 2. Fig. 3.
Fig. 4.
Witnesses
M. B. Harris
J. C. Wilson
Inventor
Abram Eugene McClendon
by
Whitman & Wilkinson
Attorneys

UNITED STATES PATENT OFFICE.

ABRAM EUGENE McCLENDON, OF CHAMBERS COUNTY, ALABAMA.

HARROW AND CULTIVATOR.

SPECIFICATION forming part of Letters Patent No. 465,193, dated December 15, 1891.

Application filed June 2, 1891. Serial No. 394,827. (No model.)

*To all whom it may concern:*

Be it known that I, ABRAM EUGENE MC-CLENDON, a citizen of the United States, residing in the county of Chambers, State of Alabama, have invented certain new and useful Improvements in Harrows and Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to that class of harrows and cultivators formed of two horizontal bars joined at one end in a V shape, the teeth being inserted in or fastened upon the bars.

The object of the invention is to provide a simple, strong, and effective mechanism for harrowing and cultivating, especially adapted for use in rough lands, consisting of adjustable curved teeth fastened upon the V-shaped horizontal bars, as will be hereinafter more fully described, and then set forth in the claim.

In the drawings, Figure 1 is a perspective view of a harrow and cultivator constructed according to my invention. Fig. 2 is a detail view of a harrow-tooth curved and adjustable at the desired angle by passing the bolt attaching it to the horizontal bar through one of the holes in the end of the tooth. The tooth may be either round or flat, and the number of holes may be increased. Fig. 3 is a similar detail view from the side of a cultivator-tooth curved and adjustable as the harrow-tooth is. The cultivator-tooth is flat and twisted, as shown in Fig. 3, and also in Fig. 4, and there may be two sets of cultivator-teeth, one set twisted more and one less for throwing earth to or from the crop to be cultivated. Fig. 4 is a detail view from the rear of a cultivator-tooth for the right side of the implement, showing the twist and showing also the shoulder to be made on all the teeth for the right side, both harrow and cultivator. For those on the left the shoulder must be reversed.

The letters A B C D designate the horizontal flat bars, of iron or other suitable material, set on edge, the bar A C being curved at B and united to the bar D B by a bolt $b$ at B.

At O is a hole for attaching the singletree.

H H are the handles, which may be attached to the horizontal bars by the same bolts that pass through the teeth at those points.

T T T are the teeth attached to the horizontal bars by bolts $b\ b\ b$, curved for harrow-teeth and curved and twisted for cultivator-teeth. The bolts $b$ at 1 2 3 pass through the end of one tooth, the middle of another, and the horizontal bar, which secures great strength.

E F are bars for adjusting the width at the rear by means of the bolt $b'$ and by tightening or loosening the bolt at B.

In Figs. 2 and 3, T T represent the teeth, and $o\ o\ o$ are the openings in the heads of the teeth for adjusting them at any angle by means of the bolts.

In Fig. 4, S represents the shoulder in the tooth for fitting it over the tooth in front.

Having thus described my invention, what I claim as new, and desire to secure by Letters Patent, is—

In a combined harrow and cultivator, the combination, with a V-shaped frame, of a plurality of teeth having curved shanks overlapping each other, and bolts passing through the frame, the forward end of one shank and the center of the next, and securing both shanks to the frame, with shoulders on the said shanks for extending the said teeth away from said frame and having a plurality of bolt-holes in the forward end of the bent portion of each shank for varying the depth of the teeth, substantially as described.

A. EUGENE McCLENDON.

Witnesses:
JAMES P. McCLENDON,
ERNEST M. OLIVER.